Patented Apr. 28, 1942

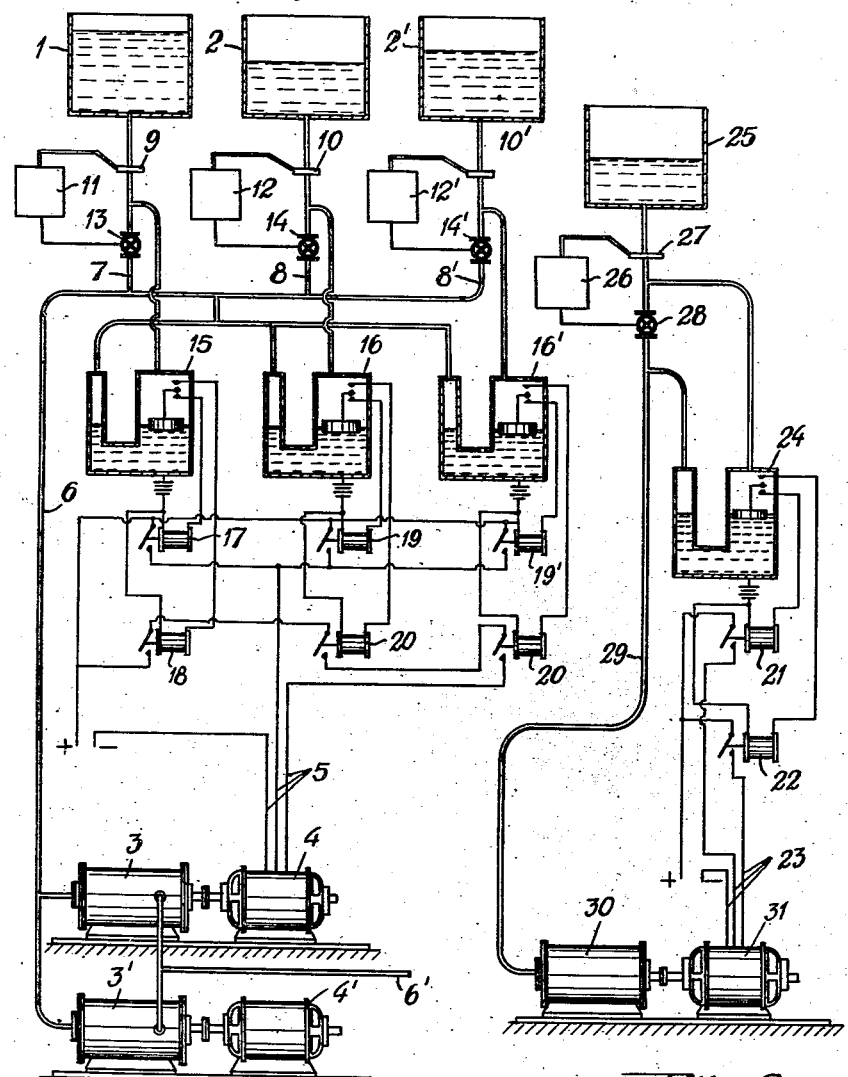

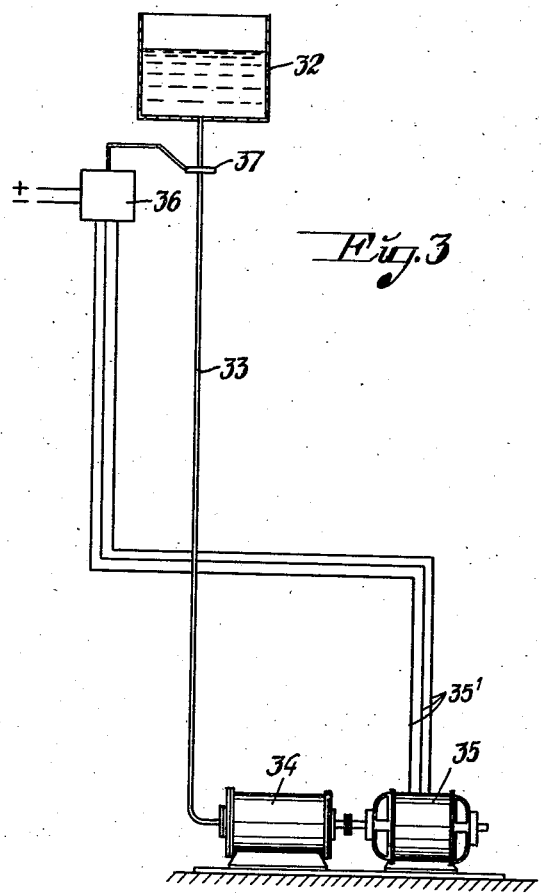
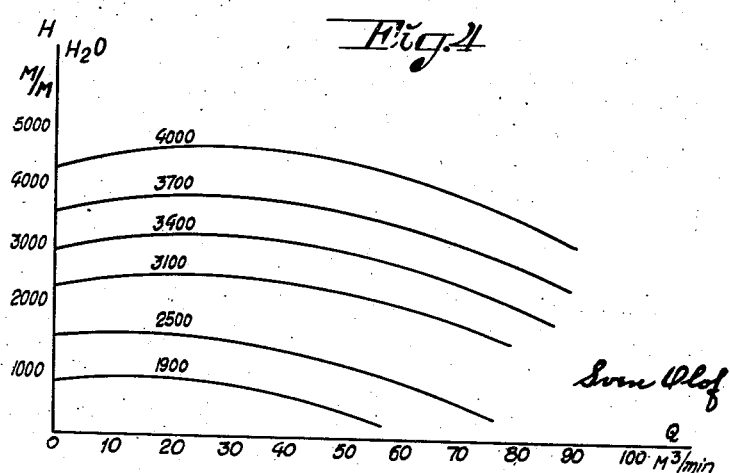

2,281,457

UNITED STATES PATENT OFFICE 2,281,457

AERATION OF FERMENTING WORT IN THE MANUFACTURE OF YEAST

Sven Olof Rosenqvist, Rotebro, Sweden, assignor to Svenska Jästfabriks Aktiebolaget, Stockholm, Sweden, a corporation of Sweden Application January 19, 1939, Serial No. 251,819
In Sweden January 22, 1938

6 Claims. (Cl. 195—142)

In the manufacture of pressed yeast it is known to blow air into the worts to increase the yeast yields. As a rule the fermentations are now performed with the use of the running-in method, the level of the wort in the vat being considerably lower at the commencement than at the termination of the fermentation. As a rule, it is desired during the start and at the termination of the process to supply less air to the wort than during the main portion of the fermentation. During the main portion of the fermentation it may also be of interest sometimes to be able to supply air quantities of different magnitudes.

Generally, one or more compressors of the same or of different types would operate on a common pressure conduit branched off to the various vats. By employing large compressor units, the air of which would be distributed to a plurality of vats, a rather low installation cost would be obtained for the compressor system. At the same time, however, the disadvantage would be incurred that the pressure on the air piping always would have to be maintained at a value corresponding to the highest back pressure prevailing in any vat.

Air taken out from the pipe system for a vat with a lower back pressure thus would have to be reduced by a valve from the higher to the lower pressure, which obviously would involve losses of energy.

With large compressor units, the losses in idle running would also be considerable at a low load.

Any control of the air quantity for the various fermentation vats could only take place manually with the arrangements described and with loss of energy. A control of the air quantity to a fermentation vat from the common conduit would entail disturbances in the air supply to the remaining vats and in order to limit such disturbances the pressure above atmospheric in the main conduit would have to be maintained at an unnecessary high value. The arrangements as hitherto used consequently could not, owing to the fact that the control would be less accurate or too expensive, ensure the proper air supply to each of the fermentation processes proceeding in the various fermentation vats at an energy cost as low as possible. By reason of the fact that the supply of the quantities of air undertaken at the fermentations could not be properly adapted with respect to the process otherwise carried out in connection with these fermentations, the lowest cost for the aeration work, the best yield of the raw materials and the best quality of the finished product consequently could not be obtained.

The present invention refers to an arrangement for the supply of air to fermenting wort in the manufacture of pressed yeast, in the use of which the above described disadvantages are avoided.

The arrangement according to the invention is principally distinguished by a compressor apparatus adapted to be controlled with respect to the delivery of air, the pressure conduit of which apparatus is connected to the plant of fermentation vats, and by an arrangement with a continuously driven member adapted to control the intensity of aeration in accordance with a previously determined aeration scheme, and which may actuate the air delivery of the compressor apparatus by influencing the compressor apparatus itself, its suction or pressure conduit or its driving machinery, or two or more of these arrangements, and which is so arranged as to adjust the compressor apparatus automatically and in accordance with an aeration scheme determined beforehand, to deliver air in a quantity and at a pressure required by the scheme at any moment. Preferably, a measuring device is provided to indicate the amount of air passing on its way to the fermentation vat, said measuring device being adapted to give impulses to the controlling doling device. According to an embodiment of the invention, the controlling doling device is adapted directly or indirectly to actuate a device, in order, in the case of double acting compressors, to convey a portion of the air to that part of the compressor which operates at a pressure below atmospheric. According to a further embodiment, a measuring device for the air in the inlet or outlet of the compressor is arranged to transmit impulses for the control of the number of revolutions of the driving engine of the compressor. Also, a measuring device for the air may be arranged to effect throttling in the inlet or outlet of the compressor so as to control the quantity of air in this way. If a compressor be used, a turbo-compressor adapted to be controlled with respect to the number of revolutions thereof is preferably made use of.

In other words, the following facilities for the control of the aeration are conceivable, inter alia, according to the invention:

(1) The performing of the impulses for the control of the air delivery of the compressor may be effected by causing them to actuate an overflow device provided in the compressor proper, said device permitting varying quantities of air to circulate within the compressor between the pressure and suction sides.

(2) The effectuation of the control impulses takes place by causing such impulses to actuate a throttle valve provided in the inlet or outlet of the compressor or in any other part of the air conduit.

(3) The process may be carried out so that the impulses are conveyed to the driving engine of the compressor, such impulses then releasing a control of the number of revolutions in said driving engine. As indicated above, a turbo-compressor is suitable for such a control of the number of revolutions. The turbo-compressor may be driven electrically or by steam power.

In the controlling doling device, the regulating impulses may either be obtained from a rotating program disk or from some other device operating in a like manner. The shape of the program disk, which is determined so as to correspond to the desired supply of air at each moment, is adapted by a lever system to actuate the current switch, for example, and thus the number of revolutions of the electric motor driving the compressor. Such a control device operates satisfactorily, if all factors, which in this case besides the number of revolutions have an effect on the air delivery of the compressor, permit of being properly calculated beforehand and are fully known at each moment.

If such were not the case, however, the impulse transmitter described must be supplemented by a member adapted to control that the quantity of air prescribed by the program disk is actually supplied to the fermentation vat. Here, a measuring member for the air quantity is inserted into the suction or pressure conduit of the compressor or at any other point of the air conduit, said member transmitting its impulses to the controlling doling device. In case of a disagreement between the air quantity prescribed by the program member and the air qunatity actually flowing forth, controlling impulses will be transmitted to increase or decrease the same.

Broadly, the air supply shall follow an aeration scheme made up before hand, in the determination of which scheme due regard is paid to the fermentation process. The desired aeration intensity is determined with due regard paid to a number of factors, such as the feeding, the nature of the mother or seed yeast, the temperature and the acid value of the wort. Here, the feeding involves the supply to the fermentation vat of the substances required, such as wort, water, extra nitrogen nutrition and, generally, all required nutrients.

The arrangement according to the invention may thus preferably be applied in connection with a continuous and automatically controlled running-in of wort and nutrients. In addition to a simplification of the apparatus and saving of labor, the invention provides for an air energy cost as low as possible for a certain fermentation process and, finally, for an improvement of the yield obtained, both qualitatively and quantitatively with respect to the raw materials supplied, everything depending on the fact that at any moment the aeration has the most suitable value with respect to the momentarily prevailing conditions in the fermentation process.

The previous manual control was unable satisfactorily to bring the aeration intensity into full agreement with that required. A manual control carried out as accurately as this according to the methods previously feasible would, if it were at all possible, involve so great costs that the carrying of the same into effect would be without any economical profit.

Three embodiments of the invention are shown diagrammatically in the accompanying Figs. 1, 2 and 3. In the drawings, Fig. 4 is a diagram representing characteristic curves relative to a turbo-compressor.

The arrangement according to Fig. 1 comprises the fermentation vats 1, 2 and 2', which are connected, through the main conduit 6 and the distributing conduits 7, 8 and 8', to the pressure side of the compressor apparatus, 3, 3', 4, 4' adapted to be controlled with respect to the delivery of air. 3 and 3' are compressors driven by the motors 4 and 4', the motor 4 being adapted by electric impulses through the wires 5 to control the delivery of air of the compressor 3 and thus of the whole plant. Inserted into the distributing conduits are the measuring members 9, 10 and 10' and the valves 13, 14 and 14' cooperating with the program disk members 11, 12 and 12', which total arrangement is adapted to dole to the fermentation vats the air quantities determined in the different cases according to the scheme. For the control of the air quantity delivery from the compressor apparatus, so that it will be of a suitable pressure, there are provided controlling pressure gauges 15, 16 and 16' adapted with their relays 17, 18, 19, 20 and 19', 20' and the switches pertaining thereto to increase or decrease the delivery of air from the compressor apparatus.

Now, the arrangement of the controlling pressure gauges acts in a manner such that, when any one of the pressure gauges transmits impulses for an increase of the pressure, that is to say for an increase of the air delivery of the compressor apparatus, this will take place even if the remaining pressure gauges take positions corresponding to a decrease. Only if all reduction relays, which are series-connected, are closed, that is to say, only if all controlling pressure gauges are adjusted for a reduction, can an impulse be given for a decrease of the air delivery. On the other hand, an increase will be effected as soon as any one of the increasing relays is switched-in. In the same manner as shown in Fig. 1, a still greater number of fermentation vats may operate on a common conduit and with a common compressor apparatus.

Another embodiment is shown in Fig. 2, where a single fermentation vat is connected to the compressor apparatus.

The fermentation vat 25 is connected through a conduit 29 to the pressure side of the compressor apparatus 30, the driving means 31 of which is controlled with respect to the speed thereof by current impulses from the conduits 23 extended over the relays 21 and 22 from the controlling pressure gauge 24.

26 is the program disk member adapted with the measuring member 27 and the valve 28 to control the air supply according to a certain scheme made up beforehand. In this simpler case, the controlling perssure gauge 27 and the valve 28 may, if desired, be excluded, the doling of the air to the fermentation vat 25 being then effected by the program disk member 26 being caused by impulses from the measuring flange 27 directly to actuate the relays 21 and 22 so as to adjust the desired air delivery from the compressor apparatus.

This simplified construction is illustrated in Fig. 3. 32 is a fermentation vat and 33 the pressure conduit connecting the fermentation vat with the compressor 34, which is driven by the motor 35, the speed of which may be controlled through current impulses in the conduits 35'. 36 is the program disk member with its relays, and 37 designates the measuring flange controlling that the air quantity desired according to the scheme and established by the program disk member is doled to the vat.

In all instances, the compressor apparatus may consist of one or more cooperating compressors, one or more of which are adapted to be controlled with respect to their delivery of air, in a manner such that the arrangement in its entirety will be controllable.

Fig. 4 shows the characteristic curves for a turbo-compressor. In the diagram, the ordinate H represents the pressure in millimeters water column, whereas the abscissa Q represents the air quantity given off in cubic meters per minute. It will be seen from the diagram that with a comparatively immaterial change of the number of revolutions from 3700 to 4000 revolutions per minute, a variation in the air quantity from 40 to 75 cubic meters per minute will be obtained at a constant back pressure in the vat, into which the air is pressed in.

By a control of the number of revolutions from 1900 to 4000 revolutions per minute, at a constant air quantity of 30 cubic meters per minute a pressure change will be obtained from 900 to 4900 millimeters water column, which consequently shows that with comparatively small alterations in the number of revolutions controls of wide ranges relative to the delivery of air are obtained, whereby an aggregate of this kind provides for particularly great controlling facilities in connection with great sensitivity. A compressor with the properties of the piston compressor alters the air quantity delivered by the same only in direct proportion to the number of revolutions.

What I claim is:

1. Apparatus for the aeration of fermenting wort in the manufacture of yeast, comprising, in combination, a fermentation vat, a variable speed air compressor, a valved delivery conduit communicating between the pressure side of the air compressor and the fermentation vat, in the delivery conduit and between the valve and the fermentation vat a device for measuring the amount of air being delivered to the fermentation vat, a program metering means with a continuously driven member which program metering means is connected to the measuring device and to the valve and adapted to vary the setting of the latter and hence to vary the quantity of air being delivered to the fermentation vat according to a predetermined program of air delivery, and a controlling pressure gauge responsive to air pressures in the delivery conduit in advance of and behind the valve to regulate the rate of speed of the air compressor.

2. Apparatus for the aeration of fermenting wort in the manufacture of yeast, comprising, in combination with a fermentation vat to which wort and nutrients are intermittently supplied according to a predetermined program, an air compressor, an electric motor arranged to drive the air compressor, a valved delivery conduit communicating between the pressure side of the air compressor and the fermentation vat, in the delivery conduit and between the valve and the fermentation vat a device for measuring the amount of air being delivered to the fermentation vat, a program metering means with a continuously driven member which program metering means is connected to the measuring device and to the valve and adapted to vary the setting of the latter and hence to vary the quantity of air being delivered to the fermentation vat according to a predetermined program of air delivery, a controlling pressure gauge responsive to air pressures in the delivery conduit in advance of and behind the valve, and a system of relays arranged to be responsive to the controlling pressure gauge and to regulate the rate of speed of the electric motor.

3. Apparatus for the aeration of fermenting wort in the manufacture of yeast, comprising, in combination, a fermentation vat, a variable speed air compressor, a valved delivery conduit communicating between the pressure side of the air compressor and the fermentation vat, in the delivery conduit and between the valve and the fermentation vat a device for measuring the amount of air being delivered to the fermentation vat, a program metering means with a continuously driven member which program metering means is connected to the measuring device and to the valve and adapted to vary the pressure of the air being delivered to the fermentation vat according to a predetermined program of air delivery, and a controlling pressure gauge responsive to air pressures in the delivery conduit in advance of and behind the valve to regulate the rate of speed of the air compressor.

4. Apparatus for the aeration of fermenting wort in the manufacture of yeast, comprising, in combination, a fermentation vat, a variable speed air compressor, a valved delivery conduit communicating between the pressure side of the air compressor and the fermentation vat, in the delivery conduit and between the valve and the fermentation vat a device for measuring the amount of air being delivered to the fermentation vat, a program metering means with a continuously driven member which program metering means is connected to the measuring device and to the valve and adapted to vary the pressure of the air being delivered to the fermentation vat according to a predetermined program of air delivery, and a controlling pressure gauge responsive to air pressures in the delivery conduit which pressure gauge is adapted to throttle the air flowing through the compressor.

5. Apparatus for the aeration of fermenting wort in the manufacture of yeast, comprising, in combination, a fermentation vat, a variable speed air compressor, a valved delivery conduit communicating between the pressure side of the air compressor and the fermentation vat, in the delivery conduit a device for measuring the amount of air being delivered to the fermentation vat, a program metering means with a continuously driven member which program metering means is connected to the measuring device and to the valve and adapted to vary the pressure of the air being delivered to the fermentation vat according to a predetermined program of air delivery, and a controlling pressure gauge responsive to air pressures in the delivery conduit, which pressure gauge is adapted to throttle the air flowing through the compressor.

6. Apparatus for the aeration of fermenting wort in the manufacture of yeast, comprising, in combination, a fermentation vat, an air compressor, a variable speed motor coupled to drive said compressor at a variable speed, a delivery conduit communicating between the pressure side of said air compressor and said vat, in said conduit a device for measuring the amount of air being delivered to said vat per unit of time, and a program metering means with a continuously driven member which program metering means is connected to and influenced by said measuring device and is adapted not only to control the amount of air being delivered through said conduit per unit of time according to a predetermined varying program of air delivery but also to adjust the speed of said motor.

SVEN OLOF ROSENQVIST.